United States Patent [19]
Schaeff

[11] Patent Number: 5,778,569
[45] Date of Patent: Jul. 14, 1998

[54] MULTI-PURPOSE CONSTRUCTION VEHICLE WITH AT LEAST TWO SUBFRAMES AND A SELF-ALIGNING BEARING BETWEEN THE SUBFRAMES

[75] Inventor: Hans Schaeff, Langenburg, Germany

[73] Assignee: Karl Schaeff GmbH & Co., Langenburg, Germany

[21] Appl. No.: 623,603

[22] Filed: Mar. 28, 1996

[30] Foreign Application Priority Data

Apr. 2, 1995 [DE] Germany ............... 195 12 061.2

[51] Int. Cl.$^6$ ............................................. E02F 3/76
[52] U.S. Cl. ................. 37/410; 37/443; 280/111; 180/418
[58] Field of Search ............... 37/410, 443; 230/111, 230/112.1, 112.2; 414/694, 699, 719

[56] References Cited

U.S. PATENT DOCUMENTS

| | | | |
|---|---|---|---|
| 3,414,072 | 12/1968 | Hodges, Jr. et al. | 280/111 |
| 3,426,720 | 2/1969 | Enos | 280/111 |
| 3,612,310 | 10/1971 | Schaeff | 414/694 |
| 3,765,553 | 10/1973 | Schaeff | 280/111 X |
| 3,797,140 | 3/1974 | McWilliams et al. | 172/307 X |
| 4,215,874 | 8/1980 | Schoelkopf | 180/418 X |
| 4,299,530 | 11/1981 | Schaeff | 414/719 |
| 4,382,604 | 5/1983 | Nakagawa | 280/112.1 X |
| 4,502,709 | 3/1985 | Schaeff | 280/758 |
| 4,552,238 | 11/1985 | Joyce, Jr. | 172/783 X |
| 4,734,006 | 3/1988 | Krob et al. | 414/719 |
| 4,892,154 | 1/1990 | Ranner | 172/72 |
| 5,180,028 | 1/1993 | Perrenoud, Jr. | 180/418 X |
| 5,295,318 | 3/1994 | Schaeff | 37/410 X |
| 5,308,220 | 5/1994 | Schaeff | 414/699 |
| 5,529,324 | 6/1996 | Krawczyk et al. | 280/112.2 |

FOREIGN PATENT DOCUMENTS

002414066 A  10/1975  Germany ............... 37/410

Primary Examiner—Terry Lee Melius
Assistant Examiner—Victor Batson
Attorney, Agent, or Firm—Shlesinger Arkwright & Garvey LLP

[57] ABSTRACT

Figure 5:
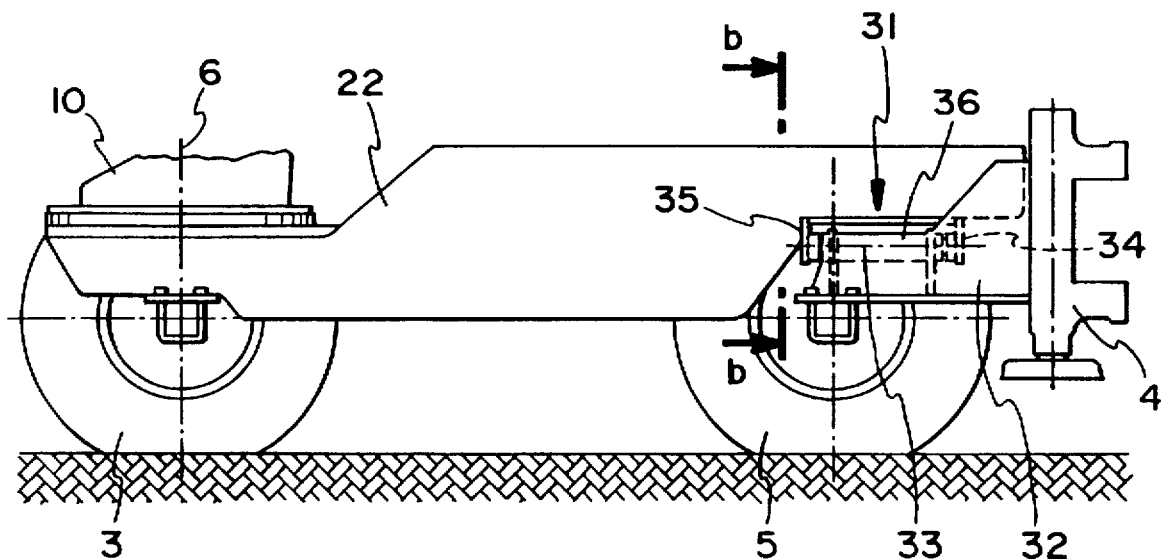

A multipurpose construction vehicle bears on its vehicle frame, which is realized as an axle-link pivot or center pivot type, a front swing loading device and a rear-mounted excavator. The swing loading device is permanently connected above the front axle (3) to a front subframe (22) which forms part of the vehicle frame, and the rear-mounted excavator is permanently connected to a rear subframe (32) which is connected to the rear axle (5) and forms part of the vehicle frame, both subframes (22, 32) being connected to one another at a suitable point along the longitudinal center axis of the vehicle by means of a self-aligning bearing (34) which can swivel about this longitudinal axis to a limited degree and by means of cylinders arranged at a distance from the self-aligning bearing on both sides, so that the two subframes can be locked with respect to one another at any desired swivel position. By means of wheel load sensors on the front axle or rear axle and via control devices, in each case the cylinder on that side of the vehicle with the greater wheel load can be actively supplied with pressure as a function of the difference between the measured wheel loads on both sides (FIG. 5).

8 Claims, 6 Drawing Sheets

MULTI-PURPOSE CONSTRUCTION VEHICLE WITH AT LEAST TWO SUBFRAMES AND A SELF-ALIGNING BEARING BETWEEN THE SUBFRAMES

The invention relates to a multipurpose construction vehicle, in particular an excavator swing loader, having a vehicle frame which is designed either with a centre pivot or an axle-link pivot and has a front loading device arranged at one of its ends and a rear-mounted excavation unit arranged at its other.

Excavator loaders have been developed by combining a tractor provided with a front loading device and a rear-mounted excavating attachment. Tractor excavator loaders, which are usually designed with a rigid frame with wheels of equal sizes and preferably have all-wheel steering and a front swing axle, are particularly common at present.

Excavator loaders with articulated steering and a rear-mounted excavator mounted on the rear half of their chassis and a front loading device mounted on the front unit are also known. While in tractor excavator loaders and rigid-frame devices the drive motor is usually arranged at the front between the swinging forks of the front loading device, in construction vehicles with articulated steering it is preferably positioned underneath the cab on the rear unit.

The invention is preferably based on the object of specifying a multipurpose construction vehicle of the type mentioned at the beginning, preferably specifically for universal construction purposes, pipeline construction, gardening and landscaping, for digging canals, laying cables and pipes, in which the usual front loading device is replaced by a swing shovel loading device and improved static stability is ensured for a further range of applications of this multipurpose machine.

Efforts to ensure that both implements of such multipurpose construction vehicles can be used as unrestrictedly as possible encounter problems with static stability and ground adhesion when travelling on uneven terrain owing to the combination of a rear-mounted excavating attachment and a swing loading device. Static stability is adversely affected by the elevated centre of gravity of a rear-mounted excavator when working on a slope or else when cornering quickly. Otherwise, in a swing shovel loading device which is arranged at the front end of the vehicle it is desirable to be able to swing the loading shovels towards both sides of the longitudinal axis of the vehicle and, for example when laying a sand bed in a ditch, to move the machine without difficulty when the loading shovel is swung laterally.

The previously described object is achieved in accordance with the invention by means of the characterizing features disclosed herein.

Since the construction vehicle according to the invention is to be capable of off-road operation, but means of compensating ground levels is normally not available with two axles which are rigidly attached to the vehicle frame, the proposed design provides compensation between the front axle and rear axle. The self-aligning bearing can be equipped with one or two so-called locking cylinders which are known per se and which are locked for stationary use of the excavator in order to increase the static stability of the vehicle in particular when there are forces acting transversely with respect to the longitudinal axis of the vehicle. During shovel loading operation and when the construction vehicle is travelling, the locking cylinder or cylinders can be used as elements for damping the swivelling.

The front and rear axles which are rigidly attached near to the respective end of the vehicle frame can either be steered individually or together, i.e. be provided with steerable wheels. When the inventive idea is applied to vehicles with articulated steering, for the ground level compensation described above (ground contact of all the wheels) the self-aligning bearing can be installed/integrated for example in an articulated swivel joint.

Figure 1:
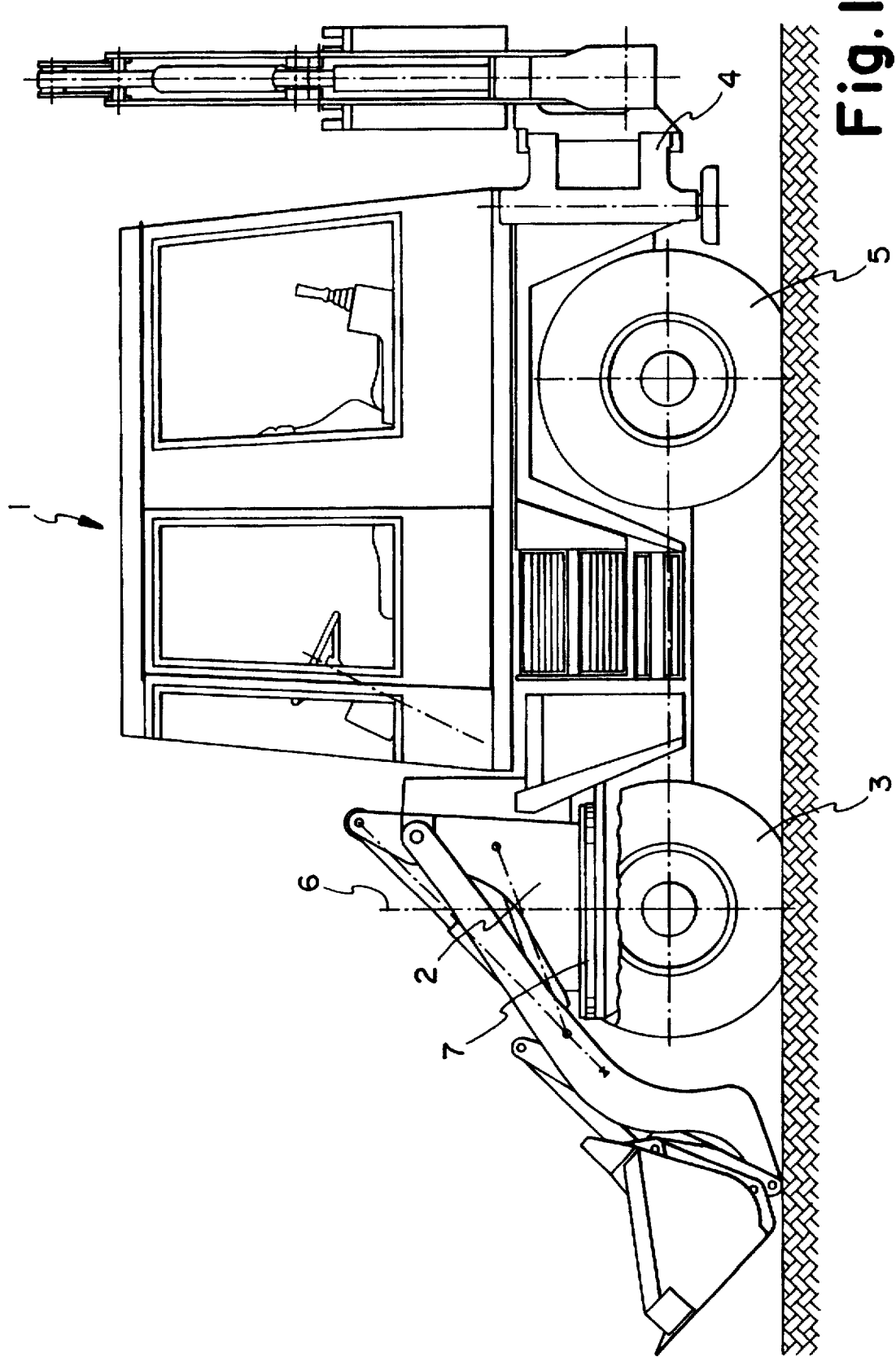
Figure 2:
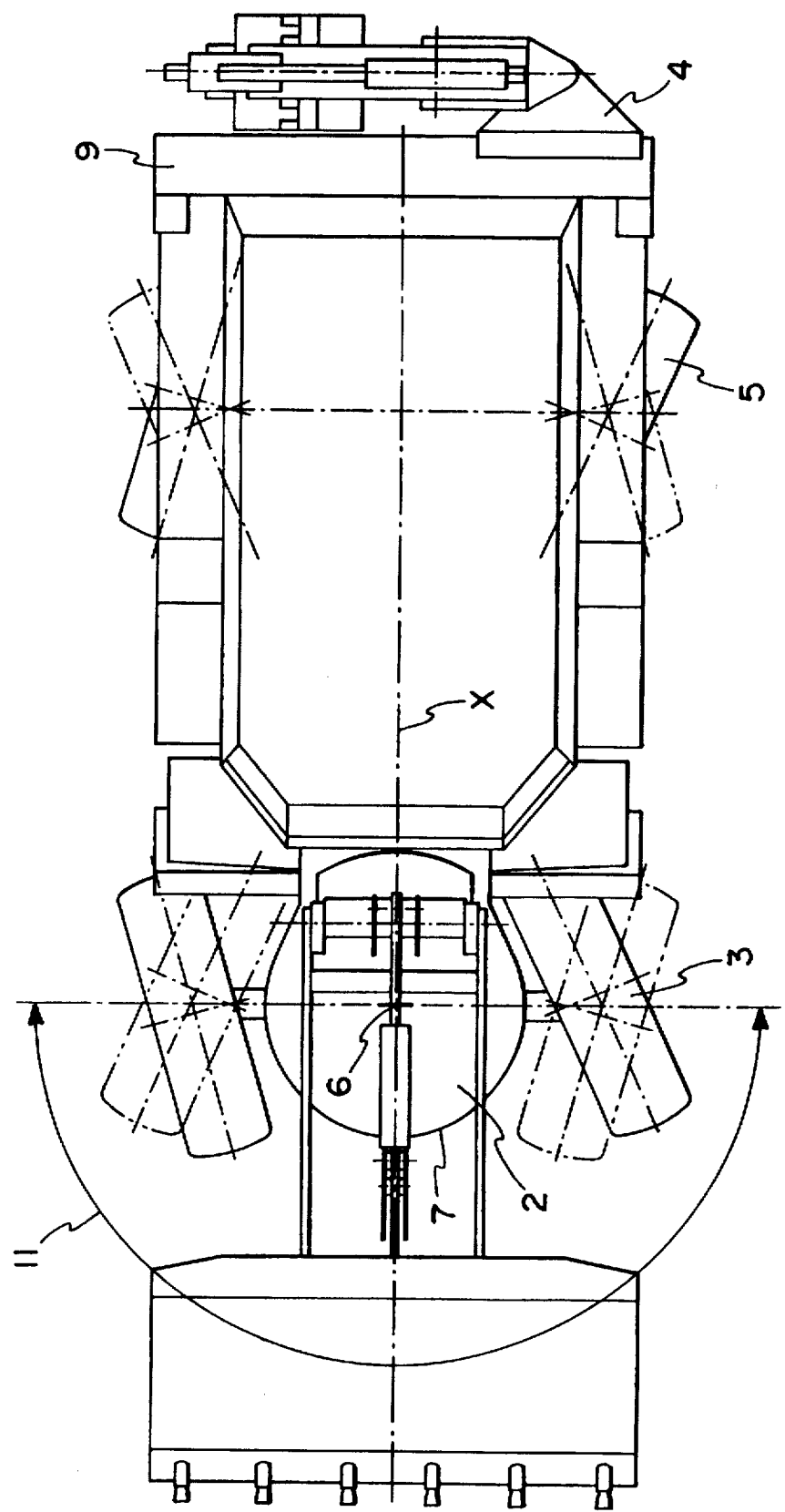
Figure 4:
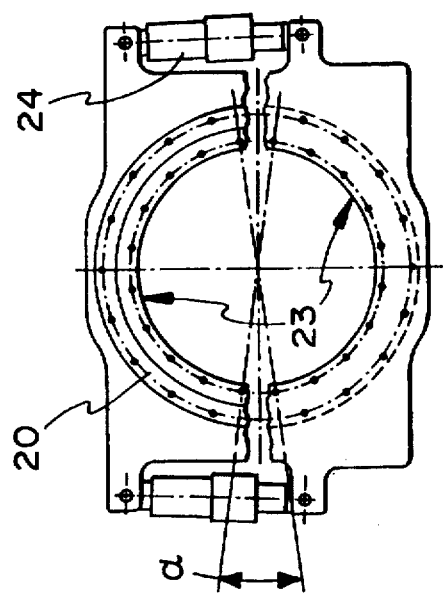
Figure 3:
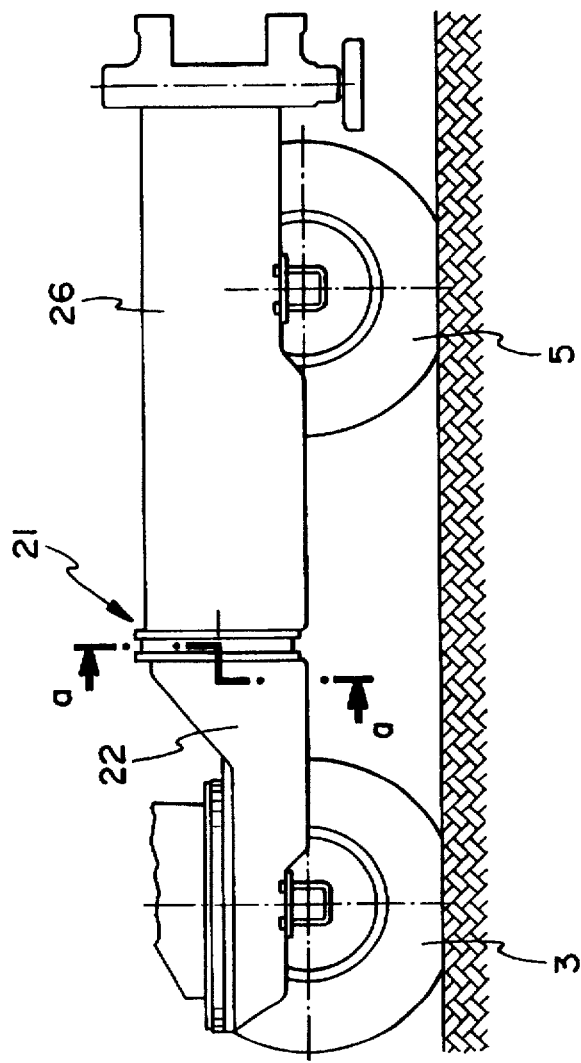
Figure 6:
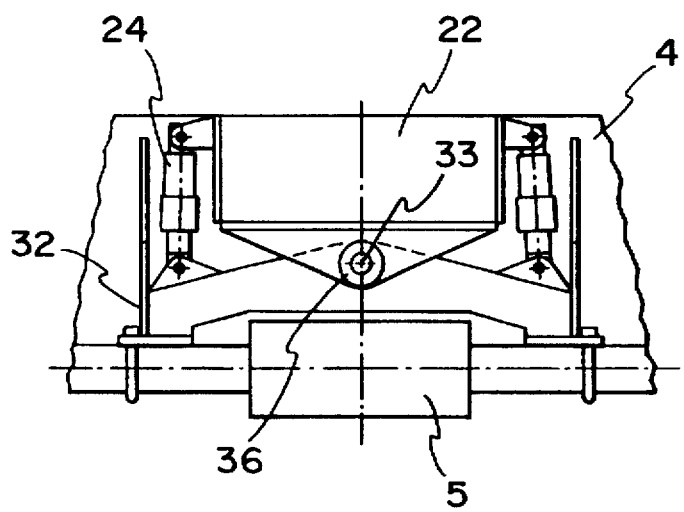
Figure 7:
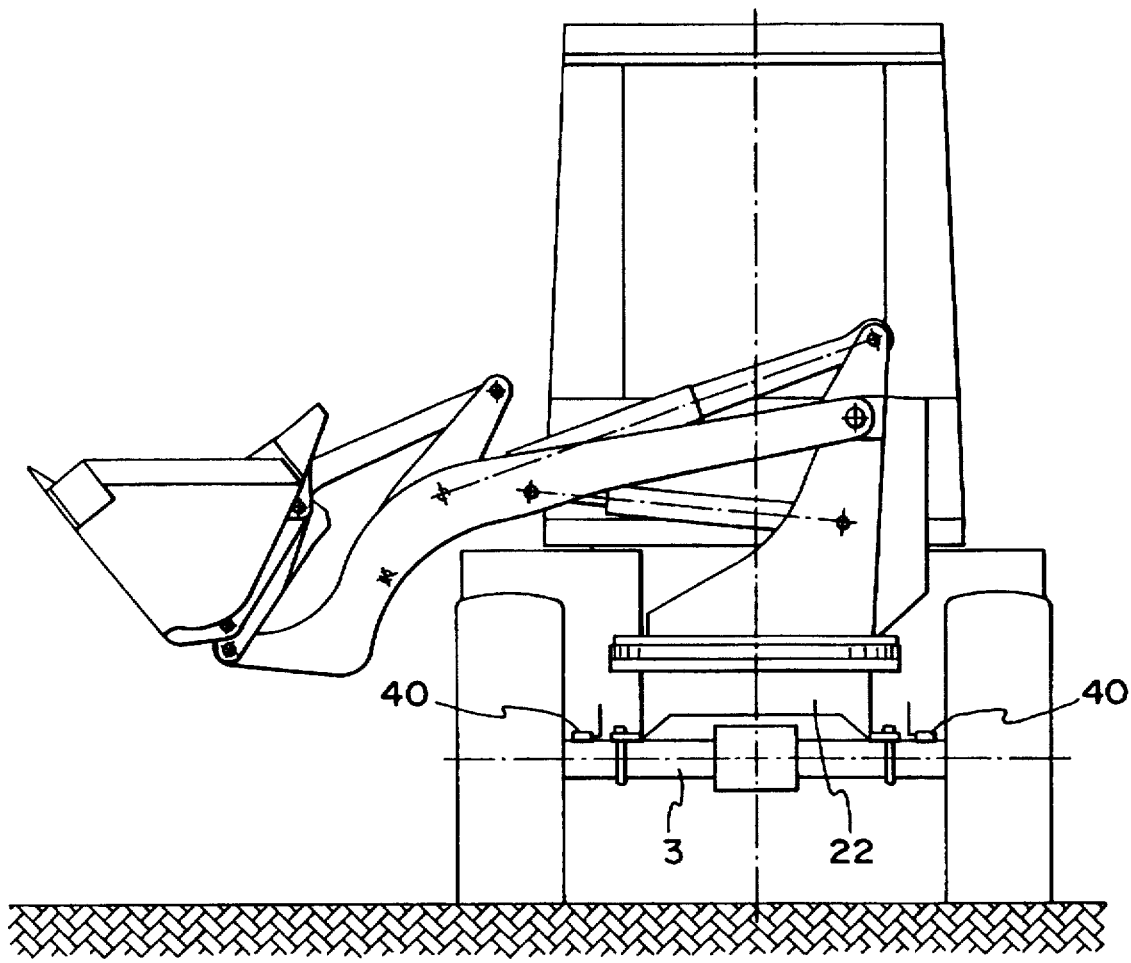
Figure 8:
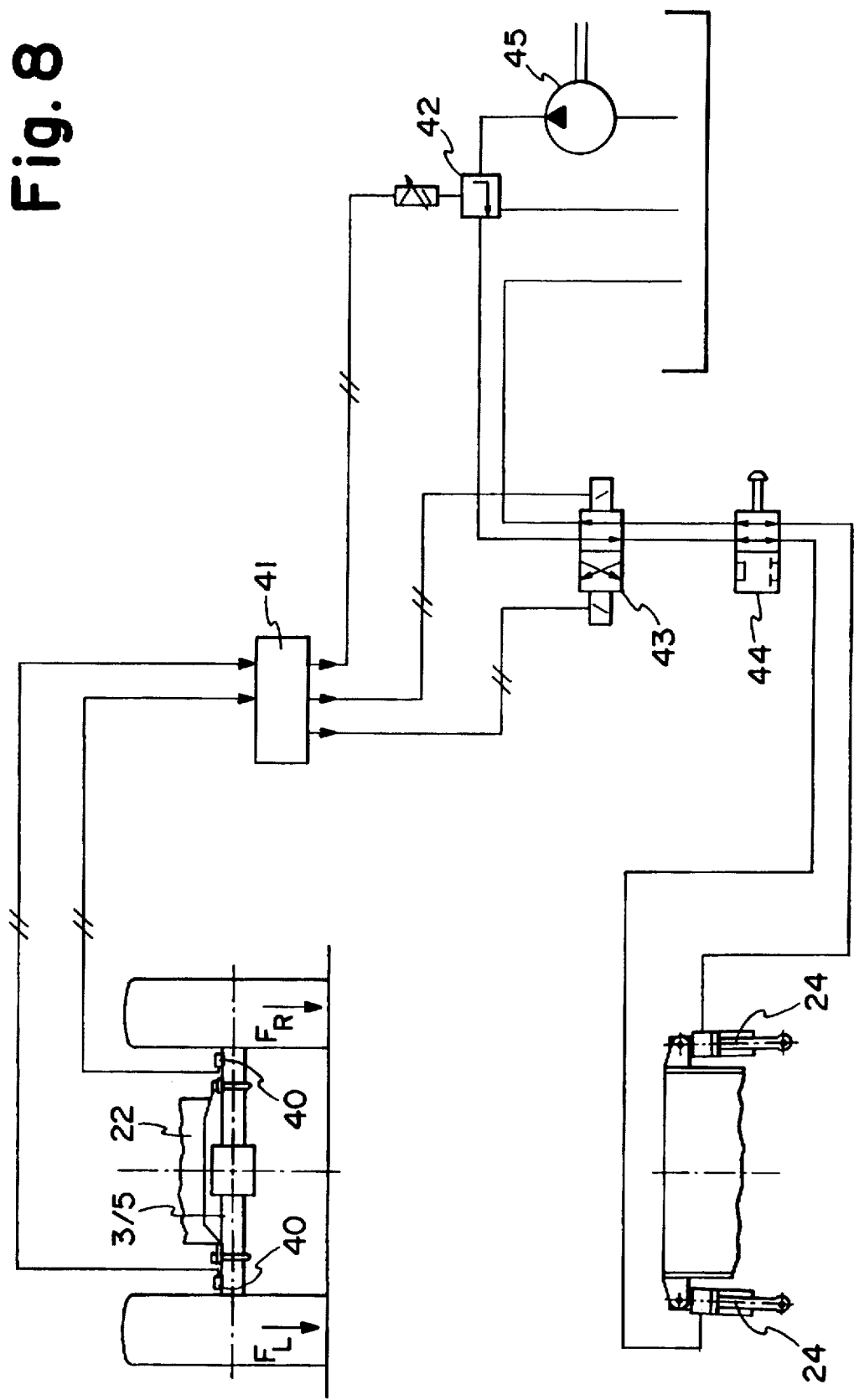

Exemplary embodiments of the multipurpose construction vehicle according to the invention are explained below with reference to the drawings, in which, in each case schematically:

FIG. 1 shows a side view of an excavator swing loader according to the invention, FIG. 2 shows a plan view of the vehicle according to FIG. 1, the two axles of which are constructed as steering axles, FIG. 3 shows a side view of the chassis of an excavator swing loader according to the invention with a self-aligning bearing which is arranged just behind the front axle, FIG. 4 shows a cross-section through the chassis according to FIG. 3 along the line a—a, FIG. 5 shows a side view of a chassis according to another embodiment with a self-aligning bearing which is arranged over the rear axle and near to the rear-mounted excavator, FIG. 6 shows a section along the line b—b in FIG. 5 through the self-aligning device of the chassis, FIG. 7 shows a front view of the construction vehicle according to FIGS. 3, 5 and FIG. 8 shows a hydraulic outline in order to explain the control of the self-aligning bearing.

FIG. 1 shows an excavator loader with a swing shovel loading device 2 which is arranged over the front axle 3 and can swing about a vertical axis 6 of a rotary bearing 7. The rotary bearing is permanently connected to the subframe 22 and the front axle 3 according to FIGS. 3 and 7. The cab 1 contains a driver's seat which faces forwards or towards the loading device and a driver's seat which is directed backwards with a control for the rear-mounted excavator 4 which is arranged near to the rear axle 5 by means of a bracket which can be adjusted on a transverse guide 9 and has extendable support feet.

In accordance with the plan view in FIG. 2, the front axle 3 and rear axle 5 are constructed as rigid steering axles (all-wheel steering), although, when required, it has to be possible to steer the front wheels or the rear wheels alone. The swing circle 11 illustrates the capability of the loading device 1 to swing laterally through approximately 180°, it being possible for it to swing towards both sides of the longitudinal centre axis X of the vehicle up to in each case 90° about the vertical axis 6.

According to FIG. 3, the vehicle frame of the construction vehicle which corresponds to FIG. 1 or 2 contains a self-aligning bearing 21 which is arranged behind the front, shorter swing loader subframe 22, so that the front subframe 22 and the rear subframe 26 which bears the rear-mounted excavator can swivel relative to one another about a horizontal longitudinal axis running through the centre of the self-aligning bearing 21. The self-aligning bearing is realized in the example in FIG. 4 as a rotary bearing 20 through whose free centre opening 23 all the hydraulic supply lines can be laid. The range of the swivel angle α of the self-aligning bearing 20 as shown in FIG. 4 is between approximately +/−6 degrees to 12 degrees. The vehicle drive engine can be installed longitudinally or transversely on the subframe 22 behind the self-aligning bearing 21. On both sides of the self-aligning bearing 21 which connects the two subframes 22, 26 to one another, these subframes are supported with respect to one another by means of hydraulic cylinders 24 which act as a swivel stop and as locking elements or damping elements.

In the exemplary embodiment according to FIGS. 5 and 6, the chassis of the excavator swing loader contains a self-aligning device 31 which is arranged directly over the rear axle 5. The rear axle 5 and the rear-mounted excavator 4 are connected by means of a rear, preferably short subframe 32, including a bearing bushing 36, to form a unit which can swing/swivel about a longitudinal axis 33 in the centre of the vehicle. The bearing bushing 36 has a certain axial length and is mounted on counterbearing components 34, 35 which are attached, at longitudinal intervals, to the front, longer subframe 22, which is permanently connected to the swing loading device, and are centred with respect to the longitudinal axis 33 and/or form the latter.

In the case of embodiments as in FIG. 5, the drive engine can be installed longitudinally or transversely directly behind the swing loader 2 in order to act as a counterweight to the rear-mounted excavator 4.

In the case of the self-aligning device 31 illustrated in section in FIG. 6, the cylinders 24 which are active on both sides as in FIG. 4 can be seen, the said cylinders 24 serving as swivel stop or as locking or damping elements between the front and rear subframes which swivel with respect to one another.

So that maximum benefit can be obtained from the essential inventive feature of the previously described ground level compensation, which can be set, eliminated or locked as desired, between the wheels of the front axle and rear axle of a combined construction vehicle formed from a rear-mounted excavator and swing loading device, the self-aligning bearing between front axle and rear axle or between the swing loader subframe 22 connected to the front axle 3 and the rear-mounted subframe 32 connected to the rear axle 5 can also be designed in a different way from the previously described examples (FIGS. 3, 5) and, when required, arranged at other suitable points on the construction vehicle between front axle and rear axle. In the case of construction vehicles with articulated steering, the self-aligning device is either integrated into the articulation joint between the front unit and rear unit or else, as in FIGS. 3 or 5, it can be however realized with the difference that in these cases it connects, in an articulated fashion, the front unit and a front subframe to one another, as in the case of 22, or the rear unit and a rear subframe, bearing the excavator device, to one another, as in the case of 32.

During excavator operation, the previously described self-aligning bearing can be locked in any desired position of the self-aligning setting using the cylinders 24 which, in the unlocked state, serve as damping elements. Moreover, the cylinders 24 can also be actively supplied with hydraulic pressure in order to increase the static stability and above all the driving safety of the vehicle. For this purpose, the change in the wheel loads between the left-hand front wheel and right-hand front wheel is measured at the front axle 3 and a corresponding hydraulic pressure is fed via an electronic computer into the piston side of the supporting cylinder 24 which is located on the side of the wheel subjected to a greater load. In this way, the tilting edge of one (or two) contact triangle(s) imagined in the plane of the ground is increased to form a contact rectangle. Not only are the front wheels loaded unequally when driving and working with the swing loader, but also the front axle load is displaced onto the inner steering wheel when steering a vehicle with articulated steering, and the elevated centre of gravity is felt particularly when travelling on roads as result of the effect of centrifugal forces when cornering due to the differences in wheel loads.

FIG. 7 shows the vehicle according to the invention from the front, similarly to FIG. 3 or 5 or also as in the described embodiment, as a vehicle with a centre pivot. The front axle 3 is bolted to the loader frame 22 with bolts and constitutes a rigid unit with the latter in this area. In accordance with FIG. 7 and FIG. 8, an electrical variable corresponding to the respective wheel load $F_L$ or $F_R$, is sensed at the free ends of the front axle (or rear axle), for example by means of voltage sensors 40 (strain gauges or pressure cells etc.). A computer (processor) 41 evaluates the measured values of the two sensors 40. If both values are approximately identical (loading shovel in the longitudinal centre axis), the variable pressure valve 42 receives the instruction: hydraulic pressure p to 0. If the difference between the two wheel loads $F_L/F_R$ increases (when loading shovel, is swung transversely or fast cornering), the valve 42 increases the hydraulic pressure p in accordance with the magnitude of this difference. The computer detects on which side of the vehicle a greater wheel load is acting and switches the electrovalve 43 to the corresponding side (for example to the right in the case of a great wheel load, the right-hand cylinder 24 is supplied with hydraulic pressure).

As described above, the driver can lock both cylinders 24 via a switch-over valve 44. Expediently, the maximum cylinder pressure p and the output volume of the pump 45 are matched to the weight of the vehicle and to the forces to be expected at a certain travelling speed; in order to minimize energy costs, a hydraulic accumulator in the pump line can reduce the output volume of the pump.

I claim:

1. A multi-purpose construction vehicle, comprising:
    a) a chassis having a first side, a second side and a longitudinal center axis and including a front subframe and a rear subframe;
    b) said front subframe being of substantial length and having an underside;
    c) said rear subframe being of a relatively short length in comparison with said front subframe and having a front end;
    d) a rear axle being connected to said front end of said rear subframe;
    e) a front axle being connected to said front subframe;
    f) a front loading device being connected to said front subframe, said front loading device being rotatable about a perpendicular axis;
    g) a drive engine being mounted to said front subframe;
    h) a driver's cabin being mounted to said front subframe;
    i) an excavating unit being connected to said rear subframe;
    j) a self-aligning bearing connecting said front and rear subframes and permitting a swivel motion of said front and rear subframes relative to each other about said longitudinal axis, said self-aligning bearing including a horizontal bearing axle and a horizontal bearing bushing and being disposed adjacent said rear axle;
    k) said bearing bushing being secured to said front end of said rear subframe;
    l) said bearing axle being secured to said underside of said front subframe and mounted inside said bearing bushing; and,
    m) a first cylinder connecting said front and rear subframes with each other and being disposed at a lateral distance from said longitudinal axis, said first cylinder being adapted to be locked while said vehicle is stationary and being adapted to provide damping of said swivel motion while said vehicle is traveling.

2. A construction vehicle as recited in claim 1, and further comprising:

a) at least two wheel load sensors disposed on one of said front and rear axles; and, b) at least one control device electrically connected to said sensors, said at least one control device being adapted to supply said first cylinder with a pressure depending on a wheel load detected by said wheel load sensors.

3. A construction vehicle as recited in claim 1, and further comprising:

a) a second cylinder, said first and second cylinders being disposed outwardly adjacent said self-aligning bearing on both sides thereof.

4. A construction vehicle as recited in claim 1, further comprising:

a) a rotary bearing having a vertical axis of rotation located centrally along said front axle, said rotary bearing connecting said front loading device to said front subframe.

5. A construction vehicle as recited in claim 1, wherein:

a) said self-aligning bearing has a swivel angle of approximately +/−6 degrees to 12 degrees.

6. A construction vehicle as recited in claim 1, wherein:

a) said rear-mounted excavating unit is transversely adjustable with respect to said longitudinal axis.

7. A multi-purpose construction vehicle having a longitudinal axis, comprising:

a) a chassis including a front subframe and a rear subframe, said chassis having first and second sides;

b) a rear axle being connected to said rear subframe;

c) a front axle being connected to said front subframe;

d) a front loading device being connected to said front subframe, said front loading device being rotatable about a perpendicular axis toward either of said first and second sides through approximately 90 degrees;

e) a rear-mounted excavating unit being connected to said rear subframe;

f) a self-aligning bearing connecting said front and rear subframes and permitting a swivel motion of said front and rear subframes relative to each other about said longitudinal axis;

g) first and second cylinders connecting said front and rear subframes and being disposed outwardly adjacent said self-aligning bearing on both sides thereof, said first and second cylinders being adapted to be locked while said vehicle is stationary and being adapted to provide dampening of said swivel motion between said front and rear subframes while said vehicle is traveling;

h) at least two wheel load sensors disposed on one of said front and rear axles; and, i) at least one control device being electrically connected to said sensors, said at least one control device being adapted to supply said cylinders with a pressure on either said side of said chassis having a greater wheel load detected by said wheel load sensors.

8. A multi-purpose construction vehicle having a longitudinal axis, comprising:

a) a chassis including a front subframe and a rear subframe, said chassis having first and second sides;

b) a rear axle being connected to said rear subframe;

c) a front axle being connected to said front subframe;

d) a front loading device being connected to said front subframe, said front loading device being rotatable about a perpendicular axis toward either of said first and second sides through approximately 90 degrees;

e) a rear-mounted excavating unit being connected to said rear subframe;

f) a self-aligning bearing connecting said front and rear subframes and permitting a swivel motion of said front and rear subframes relative to each other about said longitudinal axis;

g) a cylinder connecting said front and rear subframes and being disposed outwardly adjacent said self-aligning bearing on both sides thereof, said cylinder being adapted to be locked while said vehicle is stationary and being adapted to provide dampening of said swivel motion between said front and rear subframes while said vehicle is traveling; and, h) a rotary bearing having a vertical axis of rotation located centrally along said front axle, said rotary bearing connecting said front loading device to said front subframe.

* * * * *